(12) United States Patent
Lehan et al.

(10) Patent No.: US 6,313,782 B1
(45) Date of Patent: Nov. 6, 2001

(54) CODED PHASE MODULATION COMMUNICATIONS SYSTEM

(75) Inventors: Frank W. Lehan, Glendale; Eberhardt Rechtin, Pasadena; Walter K. Victor, Altadena, all of CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 04/069,775

(22) Filed: Nov. 16, 1960

(51) Int. Cl.[7] .................................................. G01S 7/36
(52) U.S. Cl. ........................ 342/16; 342/159; 342/17; 342/18
(58) Field of Search ....................... 250/6.6, 1.12, 250/2, 22; 331/78; 244/14; 178/22; 342/13, 16, 17, 18, 19, 159, 162, 202, 203

(56) References Cited

U.S. PATENT DOCUMENTS

| | | | |
|---|---|---|---|
| 2,175,847 | * | 10/1939 | Mathes ................................... 380/27 |
| 2,268,587 | * | 1/1942 | Guanella .............................. 342/128 |
| 2,406,881 | * | 9/1946 | Young ..................................... 380/27 |
| 2,616,031 | * | 10/1952 | Nosker ................................. 341/176 |
| 2,774,965 | * | 12/1956 | DeRosa ................................ 342/137 |
| 2,796,602 | * | 6/1957 | Hess et al. ............................. 342/44 |
| 2,840,808 | * | 6/1958 | Woodward ........................... 342/163 |
| 2,842,764 | * | 7/1958 | Harvey ................................. 342/128 |
| 2,923,496 | * | 2/1960 | Gordon ................................ 244/3.14 |
| 2,935,692 | * | 5/1960 | Cohen .................................. 327/237 |
| 2,953,643 | * | 9/1960 | Koenig ................................... 380/38 |
| 2,972,009 | * | 2/1961 | Roschke .............................. 380/218 |
| 3,029,309 | * | 4/1962 | Van Jepmond ....................... 380/35 |
| 3,099,796 | * | 7/1963 | Zadoff ................................. 375/269 |

* cited by examiner

Primary Examiner—John B. Sotomayor
(74) Attorney, Agent, or Firm—Arthur H. Tischer; Freddie M. Bush

(57) ABSTRACT

A coded phase modulation communications system which relates to communications systems in which undesired detectability of the radiated signal is materially reduced, and wherein the vulnerability of the system to interfering signals, such as, intentional jamming signals, is substantially reduced. In the system, a radio frequency communications signal is phase modulated by a random or random appearing, but repeatable pattern of noise signal. The received signal is modulated by an identical noise signal, which when synchronized with the original noise modulation results in erasing the noise, and thereby recreating the original, continuous, communications signal. The noise source of the system is a pseudo noise generator that may be readily synchronized with an identical noise source or sources. The pseudo noise generator provides an apparently orderless noise-like sequence that may be exactly reproduced at the same or at a remote location or locations.

6 Claims, 10 Drawing Sheets

Cos $w_m t$ ($w_m$ = .1mc)

BINARY PN WAVEFORM Y(t)

$Y(t) \cos w_m t$ (FREQ. SPECTRUM)

$Y(t) \cos w_m t \cos w_c t$ ($w_c$=930mc.)

$Y(t) \cos w_m t \cos w_c t$ (FREQ. SPECTRUM)

$R(\tau)$ (CORRELATION FUNCTION OF PN WAVEFORM)

FREQ. SPECTRUM OF $R(\tau) \cos w_m t \cos w_c t$

CODED PHASE MODULATION COMMUNICATIONS SYSTEM

BACKGROUND OF THE INVENTION

This invention relates to communications systems and particularly to an improved system in which the detectability of the radiated signals by means other than prescribed by the invention is materially reduced, and in which the vulnerability of the system to interfering signals, particularly intentional jamming signals, is substantially reduced.

It will be appreciated that two of the most important factors in a communication system are reliability and privacy of communication. This is particularly so in military communications, either for point to point communication, or in radar applications. It is an absolute essential requirement where the guidance of missiles is concerned. If the privacy of the system is invaded by breaking the code of the system, misleading signals can be radiated to deflect a missile from its target. If reliability is destroyed because of jamming, communications will be interrupted and in this manner a missile prevented from reaching its target.

BRIEF SUMMARY OF THE INVENTION

A particular object of the invention is to provide a communications system which is much less susceptible to interfering or jamming signals than prior art systems.

In the communications system of the invention a radio frequency communications signal is phase modulated by a random or random appearing, but repeatable pattern of noise signal. In accordance with one feature of the invention the phase modulation is between ±90°, or between a reference condition and an inverted or 180° change in phase.

A signal receiver as contemplated by the invention would provide means to modulate (multiply) the received signal by an identical noise signal, which when synchronized with the original noise modulation results in erasing the noise, and thus recreating the original, continuous, communications signal. If a signal other than one modulated by the original noise signal is received, modulation by the receiver results in a wide band spectrum signal for which the receiver resonant circuits are relatively insensitive, as these signals do not have time to normally build up in these circuits.

In radar type systems, the original noise modulation and the receiver modulation are synchronized by means of an adjustable time delay interconnected between the transmitter noise source and the receiver noise source. The measure of delay necessary to obtain synchronization is a measure of the radio path length between the transmitter and the receiver, taking into account, of course, any delay injected by a transponder where the returned signal is reradiated rather than reflected.

BRIEF DESCRIPTION OF THE DRAWINGS

In the drawings, which are intended to be merely illustrative of embodiments of the invention.

DETAILED DESCRIPTION OF THE INVENTION

Figure 1:
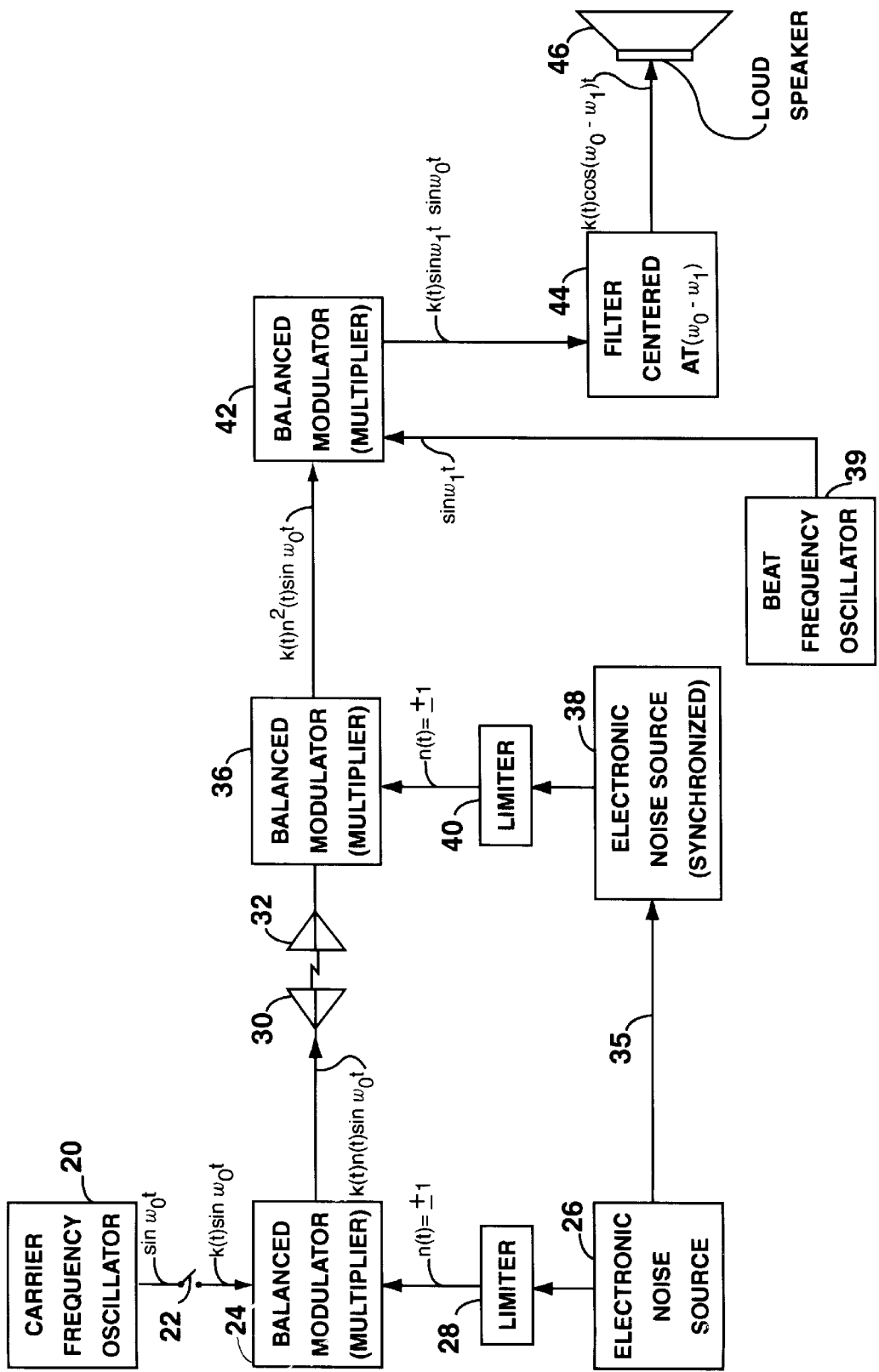
FIG. 1 is a block diagram of a point-to-point radio-telegraph communications system constructed in accordance with principles of the invention.

The telegraph system shown in FIG. 1 includes a carrier frequency oscillator 20, the output of which is keyed by telegraph key 22 and fed to balanced modulator 24. Random noise provided by electronic or pseudo-noise source 26 is also fed to balanced modulator 24, thru limiter 28, to control the phase (±90°) of the carrier output to antenna 30. The output of antenna 30 is picked up by receiver antenna 32 and fed to balanced modulator 36. A synchronized replica of the output of noise source 26, provided by source 38, is fed thru limiter 40 to balanced modulator 36. Synchronization (described below) is achieved by a landline or radio link 35. The output of modulator 36 is fed to balanced modulator 42 where it is moved with the output of beat frequency oscillator 39 to produce a tone signal which is fed thru filter 44 to loudspeaker 46.

Oscillator 20, which is operating at a frequency $w_o$, provides an output $\sin w_o t$. This is keyed by key 22 to produce an output $k(t)\sin w_o t$. This signal is then multiplied in modulator 24 by the random noise $n(t)$, which, because of limiter 26, is equal to ±1. The product $k(t)n(t)\sin w_o t$ is radiated by antenna 30 and is picked up by receiving antenna 32. The received signal is then remultiplied by $n(t)$ is modulator 36 to produce $k(t)n^2(t)\sin w_o t$; and since $n(t)$ in the receiver is also equal to ±1, the ($n^2(t)$ term becomes 1 and thus the original keyed carrier signal is restored. To produce an audible keyed tone, the keyed carrier is multiplied in modulator 42 by the output $\sin w_1 t$ of beat frequency oscillator 39. The difference frequency component, $w_o - w_1$, is passed by filter 44 to speaker 46, where it is reproduced.

Figure 2A:
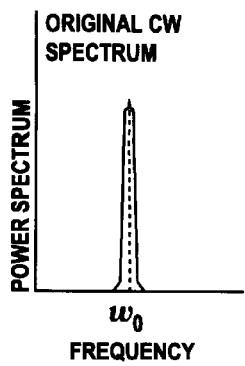
FIGS. 2–4 show a series of curves representative of the operation of the transmission system of FIG. 1 with respect to jamming signals.
Figure 2B:
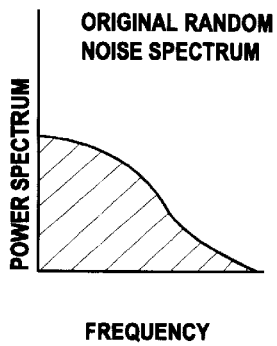
Figure 2C:
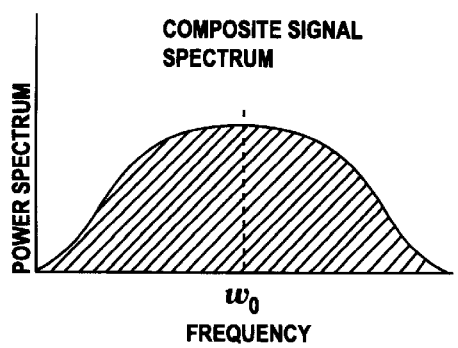

FIG. 2a illustrates graphically the keyed output of oscillator 20 as applied to balanced modulator 24. FIG. 2b illustrates the random noise as applied thru limiter 28 to balanced modulator 24. The composite product of the original signal and random noise, as produced by balanced modulator 24, is shown in FIG. 2c.

Figure 3:
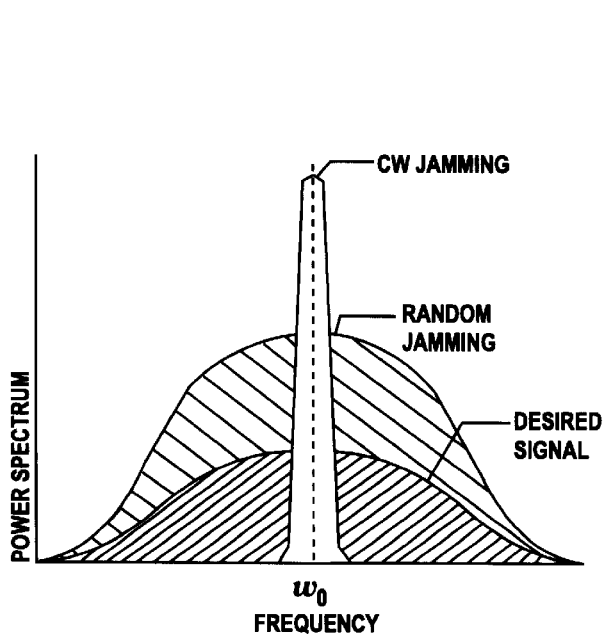

FIG. 3 shows graphically the composite output signal from balanced modulator 24 which is radiated by antenna 30 together with a C.W. jamming signal of a frequency $w_o$ and a band of random jamming signals.

Figure 4:
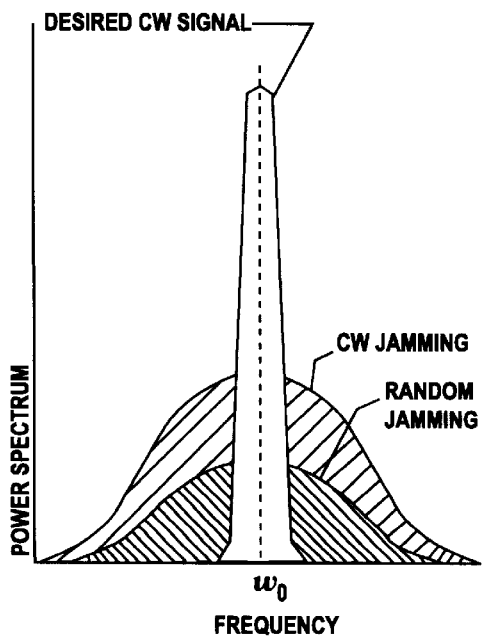

FIG. 4 illustrates graphically the effect upon the desired and jamming signals produced by balanced modulator 36. As will be observed the applied signal is emphasized and is thus quite readable while the jamming signals are comparatively reduced. This follows since the effect of the multiplication in modulator 36 of the C.W. jamming signal by n(t) is to create a new wide band spectrum as was the case when the keyed carrier was multiplied by random noise in balanced modulator 24. Similarly the effect of the multiplication of the noise n(t) by the wide band or random jamming signal in modulator 36 results in a wide band spectrum.

In summary, the process results in turning the C.W. jamming signal into a broad spectrum, to leave the broadband jamming signal with a broad spectrum, and returns the transmitted signal broadband spectrum to its original keyed C.W. spectrum gain. By this technique, the ratio of output signal to jamming power approximately equals the ratio of input signal to jamming power multiplied by the ratio of noise band-width to output filter (44) band-width. In the case illustrated, this last ratio could be made $10^6$ cycles per second divided by 100 cycles per second, or 40 db; hence a 40 db advantage over any hostile jammer is obtained. Repeat jamming could violate the assumption that the jamming is uncorrelated with the signal only if the repeated jamming signal is able to arrive within a few micro-seconds of a signal which it is repeating. This is a short time internal and demands that the repeat jammer be between the transmitter and the receiver and nearly along their line of sight. To an unintended receiving station, unequipped with a correlated code and the receiving systems of the invention and at a distance comparable to the intended receiving station, there would appear only an imperceptible increase in normal receiver noise.

As will be appreciated, a noise correlated modulation (N.C.M) system depends upon two synchronized sources of noise. One technique of accomplishing synchronization is by recording identical random noise signals. However it has been found that this presents tolerance, cost, size and weight problems in the design of equipment which are formidable. In general such equipment must have a wide bandwidth, present negligible distortion, wow and flutter, and be controllable to a fraction of a microsecond. Where portable applications are intended, such as for a missile, the device must in addition be compact and of light weight.

As a feature of the present invention an electronic noise source is disclosed which may be readily synchronized with an identical noise source or sources, does not depend upon recording and employs relatively few and uncomplicated components. It is an all electronic means and provides an apparently orderless noise-like sequence which may be exactly reproduced at the same or at a remote location or locations. This noise source, which will be referred to as a pseudo noise generator (P.N.G.), comprises a digital circuit which solves in one example the half addition binary recursion formula: $X_n = (X_{n-a} + X_{n-b})$ Mod 2, where b>a and X=0, 1. This formula has the property for certain values of a and b of producing a long periodic sequence, equal to a period of $2^b - 1$, of zeros and ones. The sequence is pseudo-random in character over an interval less than the period. This sequence is, of course, not really random, as could be determined with the proper test, but its spectrum and autocorrelations functions have properties similar to those of a truly random sequence. To the ear the sequence sounds much like random noise. Although the code described herein is breakable, more advanced versions of this code family (non-linear rather than linear) have been derived which require an impracticable amount of equipment on the part of the enemy if they are to be broken in the short guided flight time of a missile, or during other equally brief communications periods.

Figure 5:
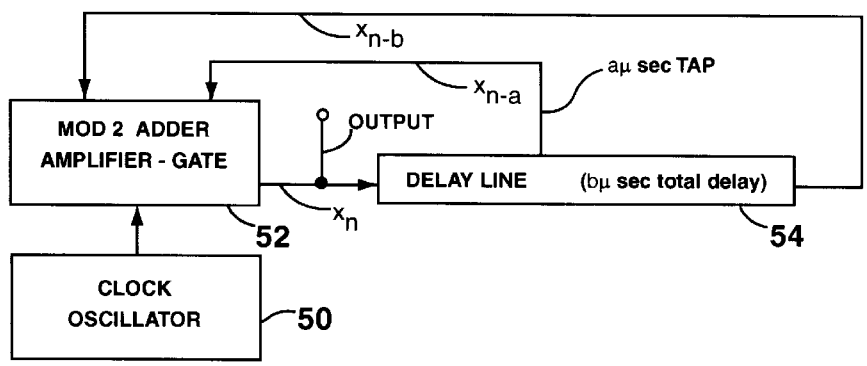
FIG. 5 shows a block diagram of a digital pseudo-noise generator constructed in accordance with an embodiment of the invention.

To examine an embodiment of pseudo-noise generator constructed in accordance with the invention, reference is made to FIG. 5. Delay line 54 provides a total delay (b) to input signals and is tapped to provide an intermediate time delay (a). Both outputs (a) and (b) are recirculated thru delay line 54 by being combined in half-adder-=regenerative amplifier 52; the output of clock oscillator 50 is also applied to half-adder 52 to gate the half adder output to provide synchronous operation. In accordance with the rule of half addition, there is an output from half adder 52 only when there is a difference between inputs (a) and (b) from delay line 54.

Figure 6:
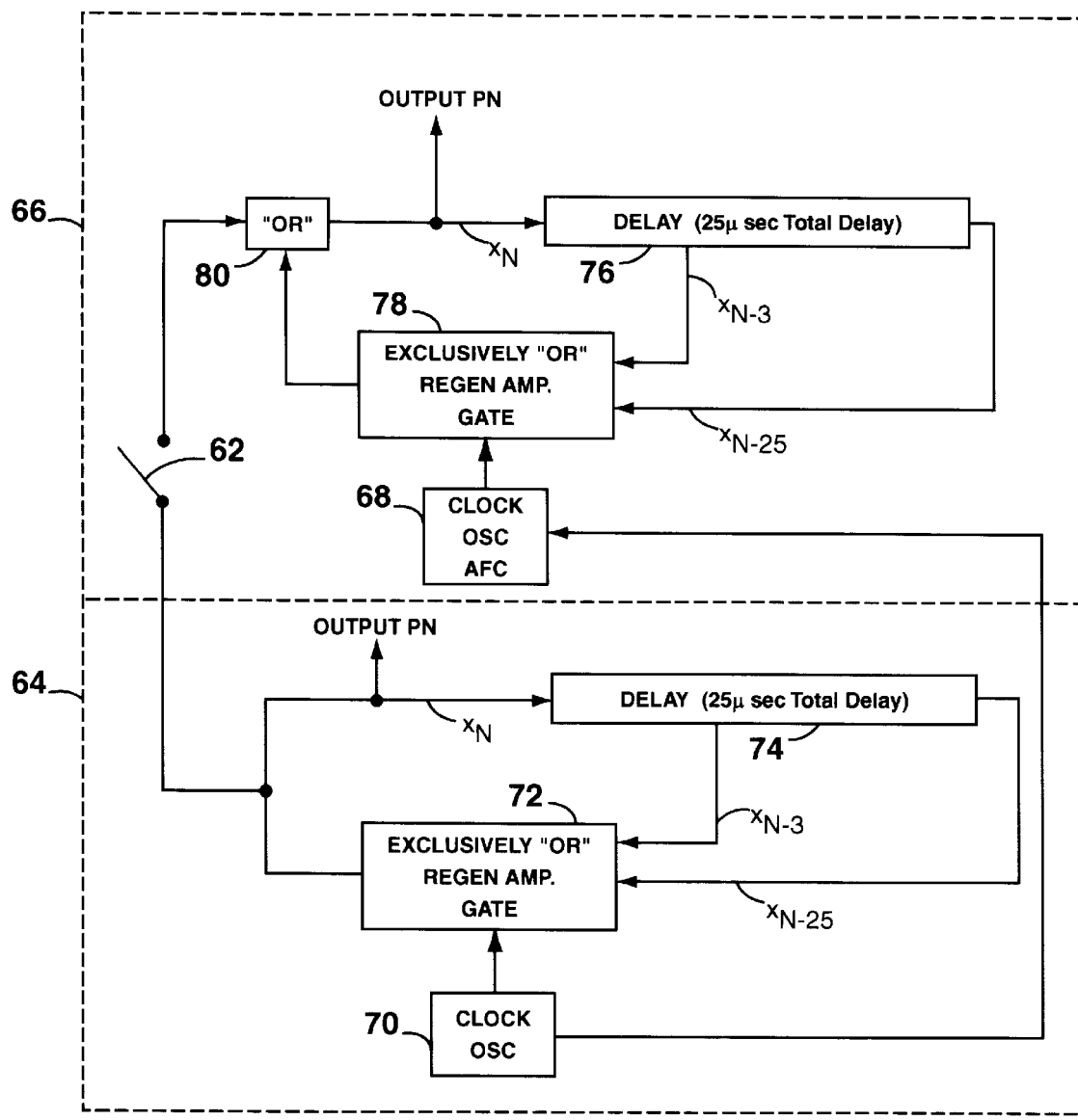
FIG. 6 shows a block diagram of means for synchronizing pseudo-noise-generators of the type illustrated in FIG. 5.

FIG. 6 illustrates an especially significant feature of the invention, a means of synchronizing digital pseudo noise generators of the general class illustrated by FIG. 5. The identical generators shown each solve the specific equation $X_n = (X_{n-3} + X_{n-25})$ Mod 2 and provide a sequence length of $(2^{25} - 1)$. If the input clock signal is at a 1 Mc. rate, the sequence will last approximately 33.5 seconds. To examine FIG. 6 assume that switch 62 is open. With switch 62 open, digital pseudo-noise generators 64 and 66 are energized by pulse clock oscillators 70 and 68, respectively. In generator 64 the output of oscillator 70 is fed thru half-adder logic circuit; or exclusively "or" circuit, 72 to the input of delay circuit 74, a delay line or series of delay lines coupled by regenerative amplifiers (to sharpen the pulse edges). An alternative embodiment of a delay circuit which may be employed would be a transistor or vacuum tube shift register. The tapped and total delay outputs of delay circuit 74 are fed back to the input of exclusively "or" circuit 72 where they are shaped by regenerative amplification and then combined by half addition to produce an output response when only the inputs differ. The clock oscillator provides the basic timing for the "or" circuit 72. The output is fed to the input of delay circuit 74. The circuit and operation of delay circuit 76, as combined with exclusively "or" circuit 78 in generator 66, is identical to that of like elements of generator 64 with the exception that the input to delay line 76 is through "or" circuit 80. A second input to "or" circuit 80 is an output, thru switch 62, from generator 64. It has been discovered that by this interconnection of generators that synchronization between the generators can be obtained. It is only necessary to close switch 62 for an instant to obtain synchronization. However switch 62 need not be an instantaneous make-break switch but may be an ordinary manual or relay-type switch. The link between clock oscillators 68 and 70 is employed to hold these oscillators in synchronization thru an automatic frequency control or other signal locking means associated with oscillator 68. One means of providing this link is by subcarrier modulation of a communications carrier.

Figure 7:
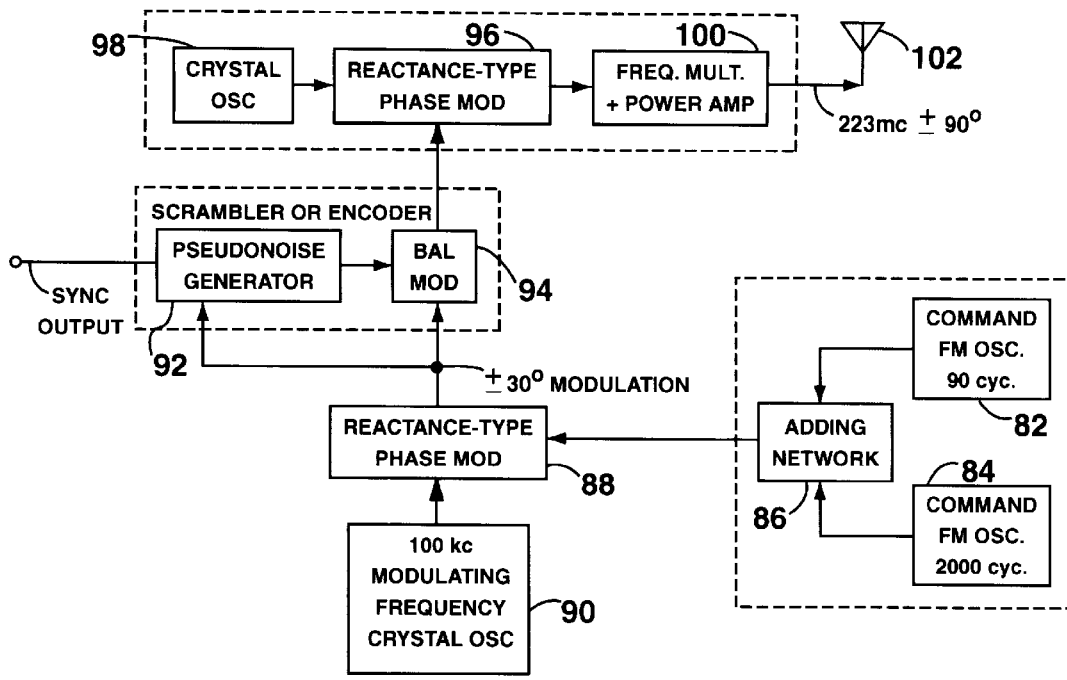
FIG. 7 shows in block diagram form a noise correlated modulation command guidance transmitter.

FIG. 7 shows a block diagram of a noise correlated modulation (N.C.M.) transmitter adapted to transmit two channels of information. As illustrated, the information is in the form of commands to be executed by a receiving vehicle such as a missile.

The command signals are generated by frequency modulating, respectively, a 90 cycle oscillator and a 2000 cycle oscillator in frequency modulated oscillators 82 and 84. The outputs from these oscillators are fed to an adding network 86 from which the combined signals are applied to reactance modulator 88 to accomplish ±30° phase modulation of a 100 kc signal supplied by oscillator 90. The output of the phase modulator 88 is supplied to pseudo-noise generator 92 and to balanced modulator 94. A pseudo-noise output of generator 92 is multiplied in balanced modulator 94 with the phase modulated clock signal and the product applied to reactance modulator 96 to produce a ±90° phase modulation of a carrier output signal originating in oscillator 98. The modulated carrier is multiplied in frequency, (if desired), amplified in output stage 100, and then radiated by antenna 102. The output frequency is 223 mc., substantially higher than the modulating frequency of 100 kc. This particular modulation technique considerably simplifies the design problems of the transmitter and receiver over alternate techniques.

Figure 8:
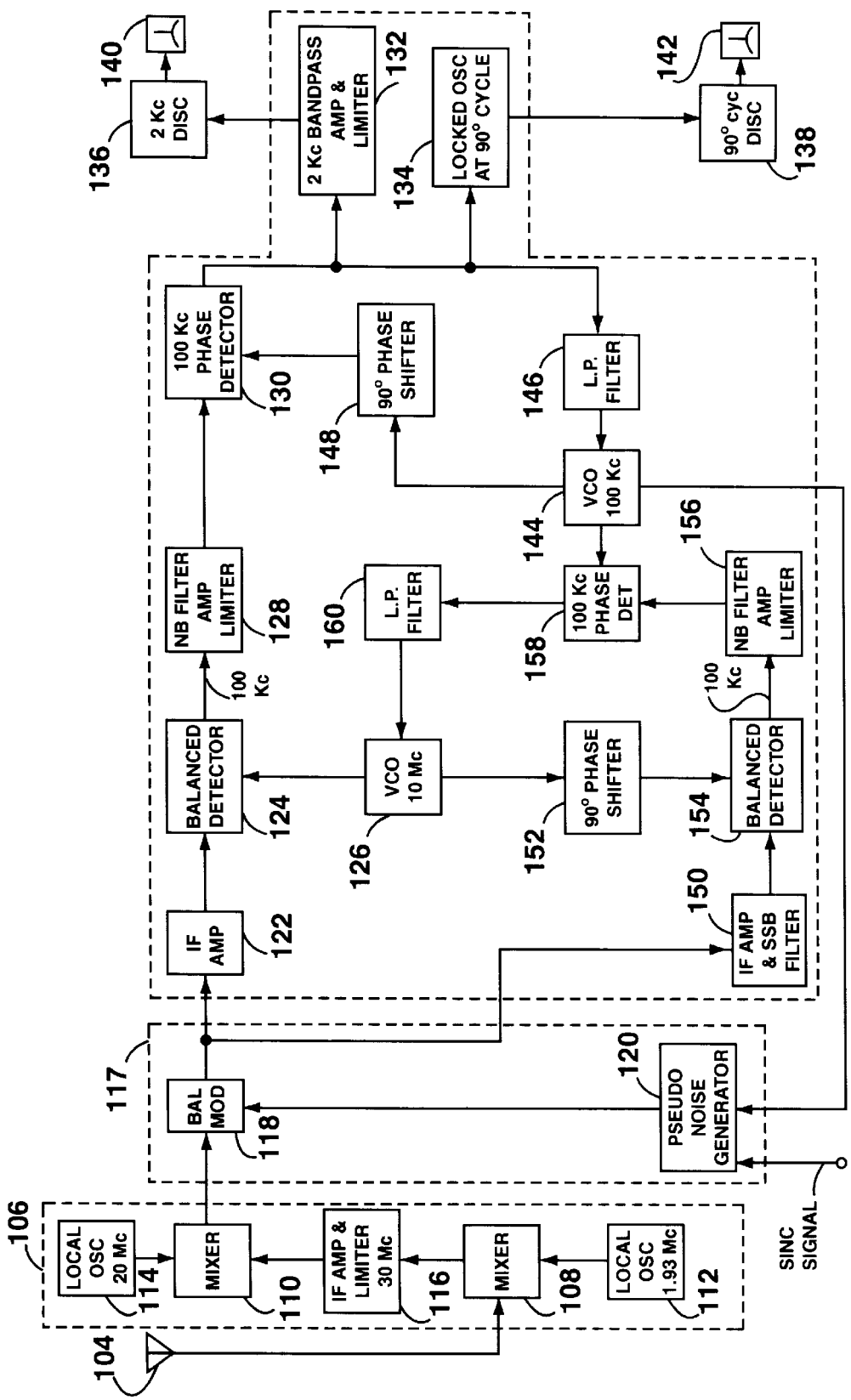
FIG. 8 shows a block diagram of a noise correlated modulation receiver constructed in accordance with the invention and adapted for use with the transmitter illustrated in FIG. 7.

FIG. 8 shows in block diagram form an N.C.M. receiver adapted to receive the commands transmitted by the transmitter in FIG. 7. The received signal from antenna 104 is fed to R.F. section 106 where it is converted from 223 mc. in heterodyne mixer 108 to 30 mc. and then in mixer 110 to 10 mc. Conversion signals are provided by 193 mc. local oscillator 112, and 20 mc. local oscillator 114. The 30 mc. intermediate frequency is amplified by amplifier-limiter 116 connected between mixer 108 and mixer 110. The 10 mc. output signal of R.F. section 106 is fed to decoder 116 wherein it is multiplied in balanced modulator 118 with a synchronized replica of the original pseudo-noise modulation supplied in this instance by pseudo-noise generator 120. The decoded signal consisting of sidebands at 9.9 and 10.1 mc. of the carrier signal having continuous variation in phase is supplied thru intermediate frequency (I.F.) amplifier 122, which attenuates frequencies above and below these frequencies, to balanced detector 124 where it is mixed with the output of local voltage controlled oscillator (V.C.O.) 126 to reproduce the 100 kc subcarrier. The existence of clean sidebands is due to the modulation technique desired earlier and is especially useful in permitting a simple jam-rejection technique. The subcarrier is then passed thru narrow band filter-limiter 128 having just sufficient bandwidth to pass the frequency modulation on the subcarrier. A major fraction of the jamming energy is excluded at this point, reducing the design difficulties of subsequent circuits. The frequency modulation is then phase detected by phase detector 130 to reproduce the original two kc. and 90 cycle command signals which are fed, respectively, to two kc. band-pass circuit 132 and locked oscillator 134. The outputs from two kc. band-pass circuit 132 and locked oscillator 134 are supplied, respectively, to two kc. discriminator 136 and 90 cycle discriminator 138 and then to separate read-out indicators 140 and 142.

The reference voltage for phase detector 130 is obtained from voltage controlled oscillator 144 which is phase-locked to the 100 kc. subcarrier. Phase-lock is accomplished by filtering, thru low-pass filter 146, the direct current output of phase detector 130, and controlling voltage controlled oscillator 144 with this output; the phase-lock loop is completed by connecting the output of voltage controlled oscillator 144 thru 90° phase-shifter 148 to an input of phase detector 130.

One output of V.C.O. 144 is employed as the clock input signal to pseudo-noise generator 120 and thus synchronism is achieved between the clock signals furnished both the transmitter and receiver pseudo-noise generators. Synchronization of the pseudo-noise generator outputs is achieved, as illustrated in FIG. 6, by interconnecting, at least momentarily, the output of pseudo-noise generator 92 (FIG. 7) to an input of pseudo-noise generator 120 (FIG. 8). To complete synchronization of transmitter and receiver, local carrier oscillator 126 is phase locked to the received carrier.

To achieve this, 10 mc. voltage controlled conversion oscillator 126 must be locked into proper phase with the single sideband signal (without carrier) obtained from SSB filter 150. The 9.9 and 10.1 sidebands are fed thru filter-I.F.-amplifier-single-side-band (S.S.B.) filter 150 which eliminates, for all practical purposes, one of the sidebands. The other sideband signal is mixed with an output (shifted 90° in phase by phase-shifter 152) of voltage controlled conversion oscillator 126 in balanced detector 154 to produce a signal of 100 kc. This 100 kc. signal is fed thru narrow-band filter-limiter 156 and phase-detected in phase detector 158 with an output from phase-locked 100 kc. voltage controlled oscillator 144. The resulting signal is filtered by low-pass filter 160 and used to control the frequency and phase of oscillator 126. By employing this single-sideband technique the phase-locked-loop is made sensitive to the phase rather than the amplitude of the modulated carrier. This offers the advantage that limiters may be employed to provide automatic gain control. The synchronization of the voltage controlled oscillators may require some initial tuning of one of the local oscillators in the R.F. section to bring the carrier intermediate frequency to within the pull-in range of the phase lock circuits.

Figure 9:
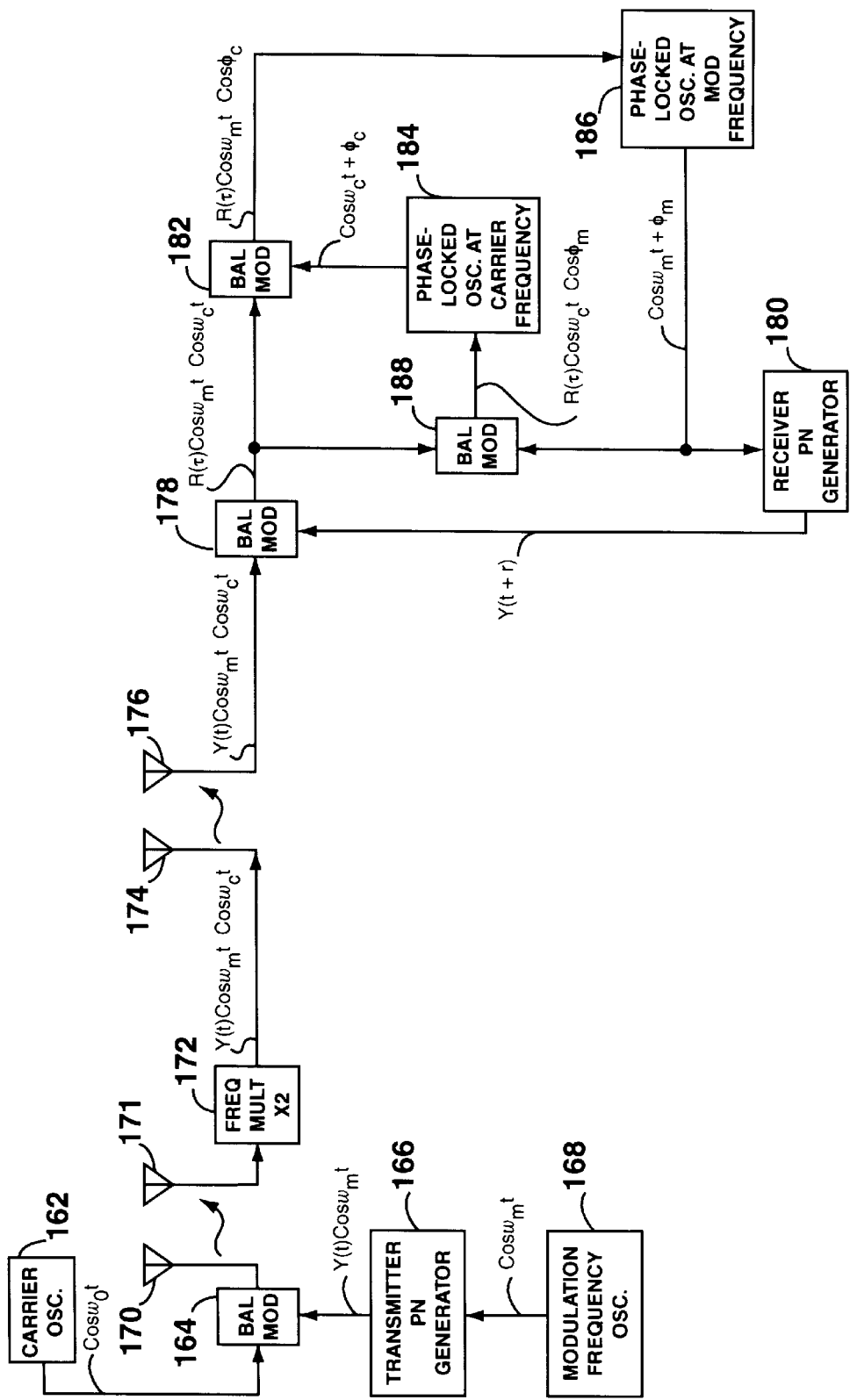
FIG. 9 shows a block diagram of a basic noise correlated modulation communications system constructed in accordance with the invention.
Figure 9A:
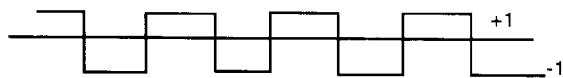
FIG. 9a–9g shows a series of curves illustrating the performance of the system set forth in FIG. 9.
Figure 9B:
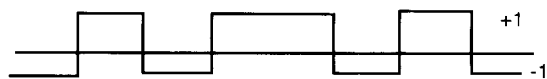
Figure 9C:
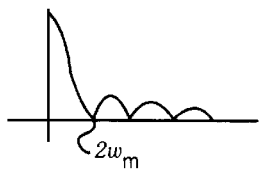
Figure 9D:
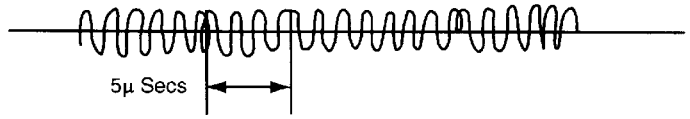
Figure 9E:
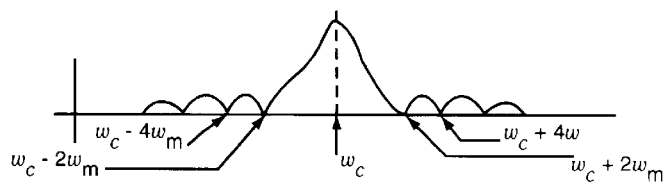

FIG. 9 shows in block diagram form the basic elements of N.C.M. radar system of the transponder type. Oscillator 162 provides an output Cos $w_c t$ which is fed to balanced modulator 164 where it is multiplied by a binary modulation signal, shown in FIG. 9c being supplied by pseudo-noise generator 166. Generator 166 is driven by modulation frequency or clock oscillator 168 providing the square wave signal illustrated by FIG. 9a. The output of balanced modulator 164 is transmitted via antenna 170 to the vehicle, such as a missile, to be observed or controlled or both, where the signal is received by antenna 171, is multiplied in frequency (times two) by frequency multiplier 172 and retransmitted by antenna 174. The frequency spectrum of the modulation signal, $y(t) \cos w_m t$ is illustrated in FIG. 9c and the wave form of the modulated signal at 930 mc. as radiated by the vehicle is shown in FIG. 9d. As will be noted the effected of the binary noise modulation is to flip the 930 mc. R.F. wave 180°. The frequency spectrum of this wave is illustrated in FIG. 9e.

Figure 9F:
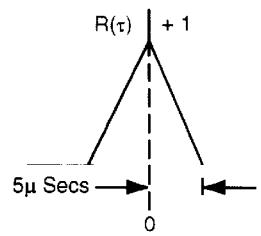
Figure 9G:
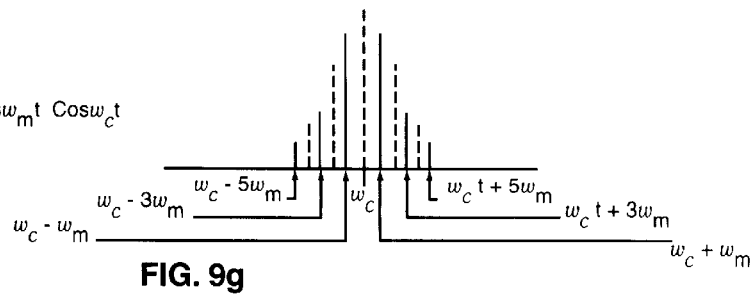

The signal from the vehicle is received at the observing station by antenna 176 where it is multiplied in balanced modulator 178 by a replica of the original noise signal supplied by receiver pseudo-noise generator 180. The output of balanced modulator 178 consists of the original modulation $\cos w_m t$ times the pseudo-noise correlation function $R(r)$ times the carrier. This composite signal is then fed to balanced modulator 182 where it is multiplied by a deomodulating signal generated by phase-locked oscillator 184 operating qt the carrier frequency $\cos w_c t + \phi_c$, where $\phi_c$ is the tracking error in the phase-lock-loop. The output of balanced modulator 182 is fed to a phase-locked oscillator circuit 186, and the output of this circuit is $\cos w_m t + \phi_m$, where $\phi_m$ is the tracking error in the modulation frequency phase-lock loop. The maximum value $\phi_m$ can have equals 180° or five microseconds at the 0.1 mc. rate. One output of oscillator 186 is multiplied in balanced modulator 188 by the output of balanced modulator 178 to provide a reference signal $R(r) \cos w_c t \cdot \cos \phi_m$ to phase-locked carrier-frequency local oscillator 184. FIG. 9f shows graphically the correlation function of the pseudo-noise waveform $R(r)$ as a function of r which equals $\phi$. Amplitude information has been deleted from the equation as it is contemplated that signals be limited to unity before being multiplied in the modulators. The receiver pseudo-noise generator is also driven by the output of oscillator 186 to provide a noise output Y(t+r) to balanced modulator 178.

Figure 10:
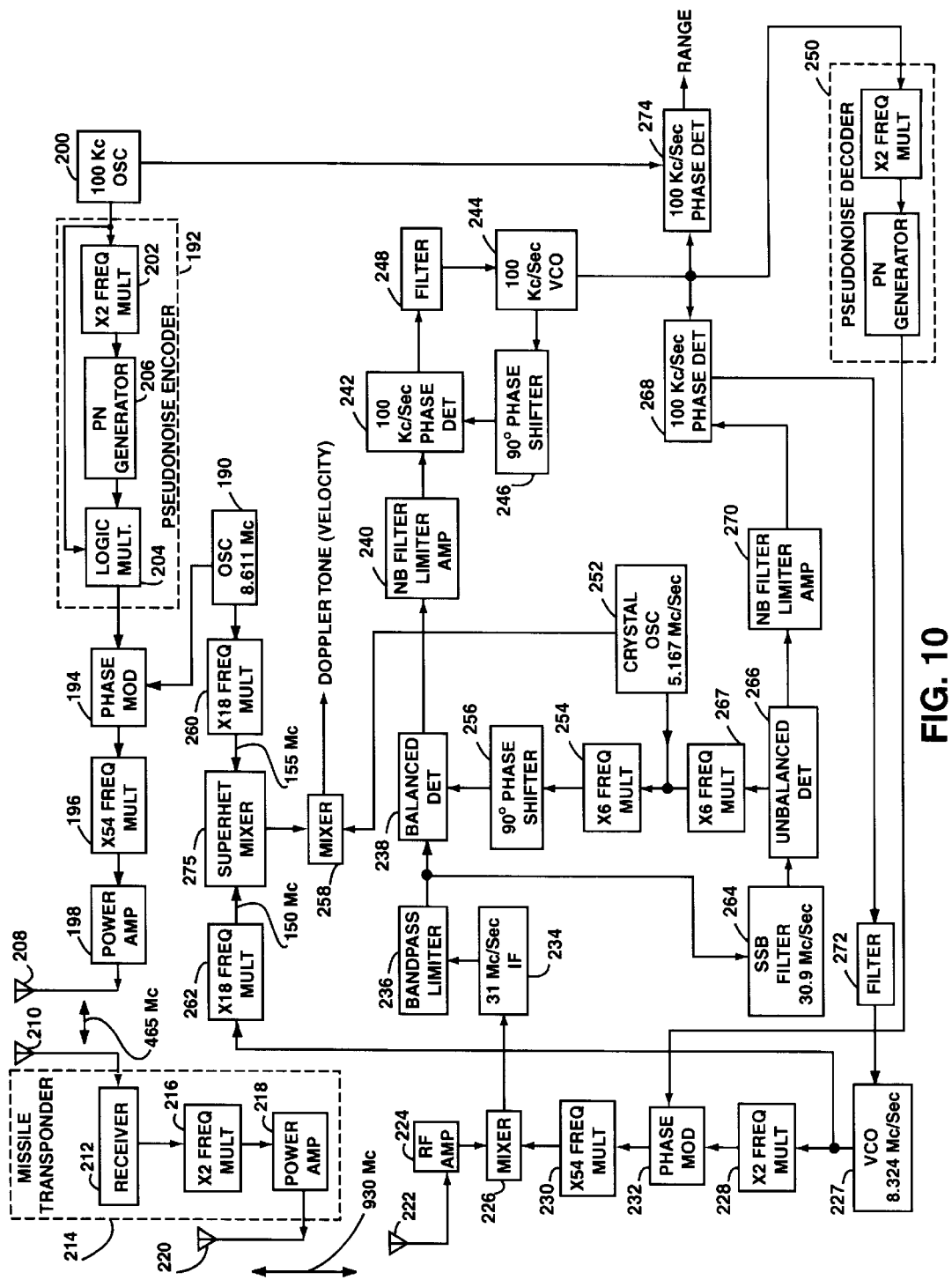
FIG. 10 shows a block diagram of a noise correlated modulation doppler-radar system as might be used to track a missile in flight.

FIG. 10 illustrates in greater detail the radar system of FIG. 9. A basic signal of 8.611 mc. is generated by oscillator 190 and phase modulated by the output of pseudo noise encoder 192 in phase modulator 194. The signal is then multiplied in frequency by multiplier 196 times 54 to provide an output carrier of 465 mc. which is then amplified by amplifier 198. A 100 kc. oscillator 200 supplies a signal to two-times frequency multiplier 202 and logic multiplier 204 in encoder 192. Pseudo-noise generator 206 is connected between the output of frequency multiplier 202 and an input of logic multiplier 204 (e.g. a balanced modulator). The output signal of power amplifier 198 is radiated by antenna 208 and is received by missile transponder antenna 210. This signal is fed to the receiver 212 of missile transponder 214 and then to two-times frequency multiplier 216 and amplifier 218. The output of transponder 214 (now 930 mc.) is radiated by antenna 220 and received by ground receiving antenna 222. The received signals are fed thru R.F. amplifier 224 to heterodyne mixer 226 where they are beat to a frequency of 31 mc. the local oscillator signal, which is heterodyned with the receiver signal to obtain a 31 mc. signal, is modulated by the output of pseudo-noise decoder 250 in phase modulator 232 and thus, as previously explained, the encoded noise is removed. The local oscillator signal is obtained from V.C.O. 227 after being multiplied two-times by multiplier 228 and 54 times by multiplier 230. Phase modulator 232 is connected between multipliers 228 and 230. The output of mixer 226 is amplified in amplifier 234 and fed thru bandpass filter-limiter 236 to balanced modulator or detector 238. The detected 100 kc. output of balanced detector 238 is passed thru a narrow-band filter-limiter-amplifier 240 to 100 kc. phase detector 242. A reference or comparison 100 kc. signal is generated by oscillator (V.C.O.) 244 and fed thru 90° phase-shifter 246 to phase detector 242. Oscillator 244 is locked in phase with the input signal thru phase detector 242 by virtue of a phase-lock loop consisting in part of low-pass filter 248 connected between the output of phase detector 242 and oscillator 244. The input of pseudo-noise decoder 250 is synchronized with the 100 kc. modulation on the received signal by a decoder connection to the output of 100 kc. phase-locked oscillator 244. The necessary demodulation signal for balanced detector 238 is supplied from local reference 5.167 mc. oscillator 252 thru six times frequency multiplier 254 and 90° phase shifter 256.

Missile velocity is determined by mixer 258 in which is compared a signal (derived thru 18 times frequency multiplier 260) from the transmitter signal and a signal phase locked to the received signal. The phase locked signal is obtained, thru 18 times multiplier 262, from the first local conversion oscillator 227, which is phase locked to the received signal as follows. One sideband of the intermediate frequency signal obtained thru single sideband filter 264, is detected in detector 266, in which the detected signal is mixed with an output of oscillator 252 which has been multiplied 6 times by multiplier 267, to provide phase detector 268, thru filter-limiter-amplifier 270, a signal of approximately 100 kc. which varies as the frequency of the sideband varies. Phase detector 268 is also fed a 100 kc. signal from V.C.O. 244 which is phase-locked solely to the 100 kc. modulation component (thus it does not change frequency with carrier drift). The output of phase detector 268 controls, thru low-pass filter 272, the frequency of first local conversion oscillator 227. The result is a phase-lock with the received R.F. signal. The effect of any drift by oscillator 252 on the doppler velocity signal is eliminated by coupling a signal from oscillator 252 to doppler mixer 258. The transmitted and received signals are first compared in mixer 275 and the output of mixer 275 then compared in doppler mixer 258 with the output of oscillator 252 to obtain a doppler tone indication of missile velocity. Missile range is determined by phase detector 274 which compares the outputs of transmitter modulation oscillator 200 and receiver phase-locked oscillator 268.

Figure 11:
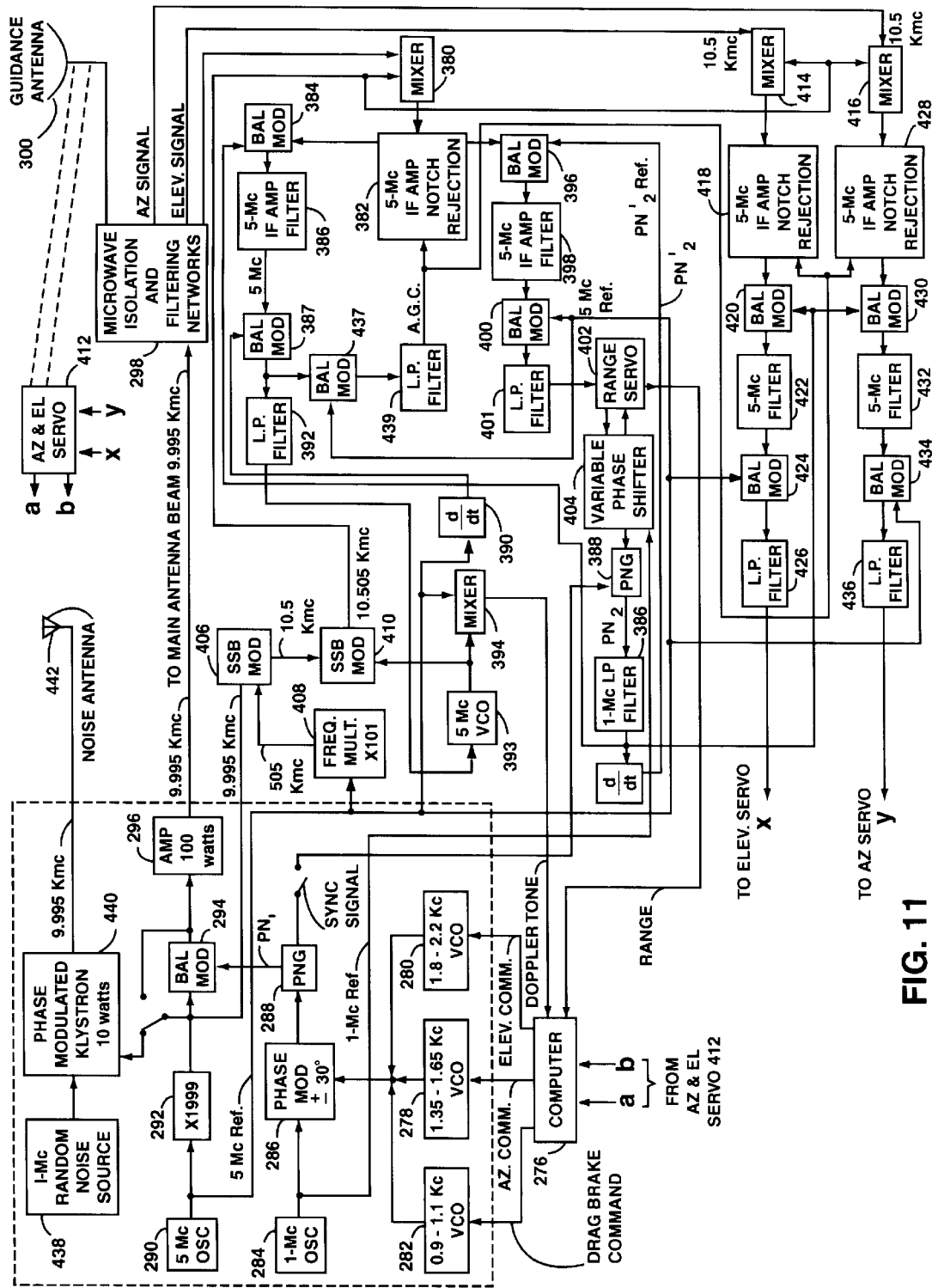
FIG. 11 shows a block diagram of the ground radio-radar circuits of a noise correlated modulation (N.C.M.) command guidance system.
Figure 12:
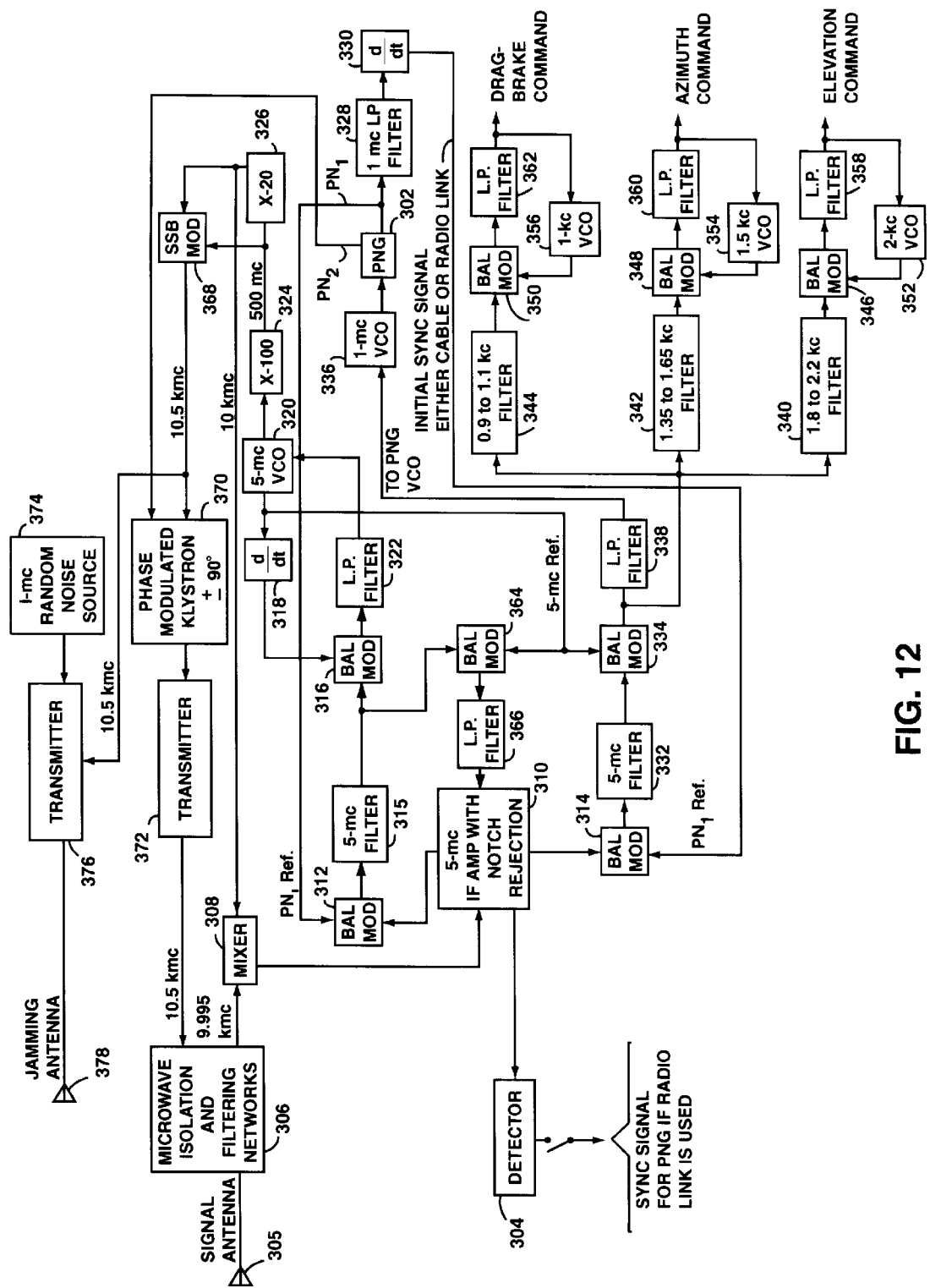
FIG. 12 shows a block diagram of the flight receiver-transmitter circuits of a noise correlated modulation system adapted to be employed in a missile for receiving commands from the ground station shown in FIG. 11 and for responsive transmission back to the ground station.

FIGS. 11 and 12 show a combined radar and radio missile guidance system employing pseudo-noise correlated modulation. FIG. 11 shows the ground radio-radar circuits and FIG. 12 shows the missile circuits. Considering first FIG. 11, guidance and control signals from computer 276 are fed separate audio frequency voltage controlled oscillators 278, 280 and 282 to vary the frequency of these oscillators, respectively, in accordance with guided missile azimuth, elevation and drag brake commands. One mc. oscillator 284 generates a subcarrier which is phase modulated by the output of audio frequency oscillators ±30° in phase modulator 286. The output of this phase modulator is then coded by a PN code in pseudo-code generator 288. Five mc. oscillator 290 provides a base or reference frequency which is multiplied by 1999 in multiplier 292 to provide a carrier frequency of 9.995 kmc. This carrier frequency is modulated in balanced modulator 294 by the output of pseudo-noise generator 288, is amplified in amplifier 296 and fed thru microwave isolation and filter network 298 to tracking antenna 300. The signal is transmitted to the missile receiver-transponder.

Turning now to FIG. 12, pseudo-noise generator 302 in the missile is synchronized before launching by means of either a radio (thru detector 304) or wire connection. The signal received by the missile antenna 305 is fed thru microwave isolation and filter network 306 to mixer 308 where it is mixed with a 10 kmc. locally generated signal to provide an intermediate frequency of 5 mc to amplifier 310, which has been provided with notch rejection for a narrow band at 5 mc. The purpose of this notch is to reject a possible jamming C.W. signal at the receiver input frequency. Wide-band I.F. signals now go to two balanced modulators, 312 and 314, in one of which, modulator 312, the signals are phase detected by the synchronized pseudo-noise $PN_1$ obtained from pseudo-noise generator 302. The effect is to restore the carrier as a narrow band signal at five mc. Broad-band jamming, if present, appears as broad-band noise, and narrow-band jamming is converted to broad-band noise. The signal and noise output of modulator 312 is now fed thru a narrow bandpass filter 315, which can remove 10 to 20 db of the power in the jamming signals.

The five mc. output of filter 315 is fed to balanced modulator 316 along with the differentiated output (from differentiating circuit 318) of five mc. voltage controlled oscillator (VCO) 320. The output of balanced modulator 316 is fed back thru low-pass filter 322 to remove an additional 10 to 20 db of jamming power and to control the frequency of five mc. oscillator 320, thus achieving a phase lock. This same oscillator, its frequency multiplied by two thousand (times 100 in multiplier 324 and times 20 in multiplier 326) provides the 10 kmc. local oscillator signal which is beat with the incoming signal to produce the five mc. intermediate frequency. The object of the phase-lock-loop is to phase lock the local oscillator to the signal received by the missile. The bandwidth of the phase-lock-loop is set to be able to follow anticipated oscillator instabilities and doppler shift and yet be as narrow as possible in order to facilitate the rejection of jamming signals. A bandwidth of 200 to 1000 cycles per second should be sufficient for an X-band system of the type described.

As previously indicated, the output of amplifier 310 is also supplied balanced modulator 314 in which it is multiplied by a differentiated output $PN_1$ of pseudo-noise generator 302. This output is obtained thru low-pass filter 328 and differentiator 330. Balanced modulator 314 has no output when the local pseudo-noise phase is exactly synchronized with the received pseudo-noise. If, however, the two are slightly out of synchronization, a carrier is produced, its magnitude and polarity (with reference to the carrier in the RF lock loop) being proportional to the magnitude and sing of the synchronization-time error for small errors. If the size and sense of this carrier are plotted as a function of synchronization-time error, an S-curve will result. This curve will be similar to the curve occurring in range tracking or conventional pulse tracking radars when early-late gating is used. To utilize this characteristic the output of balanced modulator 314 is passed thru five mc. filter 332 which must be wide enough to pass the audio modulation sidebands and then fed balanced modulator 334 where it is compared with the output of local 5 mc. oscillator (VCO) 320. It is in phase with this oscillator or in opposition, rather than in quadrature. The output of balanced modulator 334 is passed thru a low-pass filter 338 and fed back to perturb the frequency of one mc. oscillator 336 which drives pseudo-noise generator 302. The response of this feed-back or servo-loop need be only a few cycles wide because of the low frequency of the 1 mc. oscillator. This loop is not able to follow the transmitted audio phase modulation of the pseudo-noise; consequently, the audio tones are demodulated by balanced modulator 334 and appear at the input of low-pass filter 338. These tones, representing elevation, azimuth and drag-brake commands, are separated by band-pass filters 340, 342 and 344, and are fed, respectively, to balanced modulators 346, 348 and 350 in which they are phase-locked, respectively, with voltage controlled oscillators 352, 354 and 356. Balanced modulators 346, 348 and 350 are connected, respectively, thru low-pass filters 358, 360 and 362 to the inputs of voltage controlled oscillators 352, 354 and 356. The output command signals; elevation, azimuth and dragbrake, appear at the output of low-pass filters 358, 360 and 362, respectively.

Automatic gain control is achieved by coherently detecting a portion of the output of filter 314 with respect to the output of local oscillator (VCO) 320 in balanced modulator 364 and feeding the detected voltage thru low-pass filter 366 to an appropriate bias connection in common I.F. amplifier 310.

To provide a reply carrier of 10.5 kmc., the 10 kmc. local conversion signal is combined in single-side-band modulator 368 with a 500 mc. output of frequency multiplier 324. The reply carrier is modulated by modulator 370 with a second pseudo-noise $PN_2$ which may conveniently be obtained by employing a generator circuit which combines two generators of the general type illustrated in FIG. 5 and combines generator signals. Two different but definitely related sequences may be obtained in this manner. The use of two noise codes rather than one avoids the remote possibility of repeat jamming if the jammer is closer to the launching site than the missile.

As a further protective measure, true random noise from source 374 is employed to modulate a low power transmitter 376 (transmitting at the same frequency as transmitter 372) which powers antenna 376 positioned to radiate in the general direction of a potential jamming source. This is provided in order to foil attempts to break the code. In many instances it may be acceptable to eliminate this feature as it is unlikely that the code would be broken in the brief period of missile travel.

After the missile is synchronized with the ground unit, which is accomplished as discussed above with respect to FIG. 6, synchronization is maintained by means of the R.F. and PN synchronizing or phase lock loops described. Jamming or local interference of practical levels will not cause loss of synchronization because of the rejection margin of the noise correlation modulation equipment to any but the proper signal. In fact a number of N.C.M. guidance systems may be used simultaneously on the same frequencies and in close proximity with, of course, different pseudo-noise codes.

Considering again FIG. 11, the signal received from the missile (FIG. 12) by antenna 300 is fed via antenna signal isolation network 298 to mixer 380 where the signal is heterodyned to five mc. It is then fed to five mc. wide-band I.F. amplifier 382 having a notch rejection filter.

The handling of the signal in the R.F. and P.N. loops is similar to that described with respect to the missile unit, the differences occurring after the last balanced modulator in each section. These differences derive from the fact that the R.F. and P.N. signals which can be generated locally differ from the received signal only in doppler and range effects. These differences are, of course, the quantities which are to be measured. To examine in brief the signal loops, the output from I.F. amplifier 382 is fed to the upper balanced modulator 384 where it is multiplied by $PN_2$ derived thru one mc. low-pass filter 386 from pseudo-noise generator 388. The output of balanced modulator 384 is fed thru five mc. I.F. amplifier-filter 386 to balanced modulator 387 where it is multiplied by the differentiated output of reference oscillator 290, the differentiation being produced by differentiator 390. An output of balanced modulator 387, is passed thru lowpass filter 392 and employed to control the frequency of five mc. voltage controlled oscillator 393 and thus lock oscillator 393 to the received signal. The output of oscillator 393 is then compared in mixer 394 with an output of the five mc. reference oscillator 290, from which the transmitted signal is obtained. The result is a doppler tone representing the velocity of the missile. This tone is fed to computer 276 which computes missile commands.

A second output from I.F. amplifier 382 is fed to balanced modulator 396 in which it is multiplied by $PN_2$, which is a differentiated output of pseudo-noise generator 388. The output of balanced modulator 396 is fed thru 5 mc. amplifier-filter 398 to balanced modulator 400 where it is multiplied by an output of five mc. reference oscillator 290 to produce a P.N. synchronizing error voltage which is fed thru low-pass filter 401 to range servo 402. This servo drives a goniometer variable phase shifter 404 which can continuously vary the phase of a one mc. input to pseudo-noise generator 388. This generator provides $PN_2$ pseudo-noise which is synchronized with the other ground pseudo-noise generator 288 before launching. Phase shifter 404 is thus able to advance or retard $PN_2$ in time to obtain coincidence with the $PN_2$ pseudo-noise from the missile, to track the missile in range. The position of the servo-motion provides a means of direct readout of missile range.

The 10.505 kmc. local oscillator signal fed mixer 380 is obtained as follows. An 9.9995 kmc. output of multiplier 292 is added (in frequency) in single-sideband modulator 406 with the 505 mc. output of multiplier 408 (driven by five mc. reference oscillator 290) and the resulting 10.5 kmc. output is added (in frequency) in single-sideband modulator 410 to a five mc. output of phase locked voltage controlled oscillator 392.

Azimuth and elevation error signals to drive servo 412, which positions antenna 300 and supplies azimuth and elevation information to computer 276, are obtained by coherent detection of the received signal. Split beam azimuth sensing and elevation sensing signals are obtained thru isolation and filter networks 298 in a manner within the general technique employed in simultaneous lobing radar and supplied respectively, to elevation mixer 414 and azimuth mixer 415. The 5 mc. output of mixer 414 is amplified in amplifier 418 (same as amplifier 382) and decoded in balanced modulator 420 with a $PN_2$ signal from pseudo-noise generator 388. The decoded signal at 5 mc. is fed thru 5 mc. band-pass filter 422 and coherently detected in balanced modulator 424 with the transmitter reference signal from oscillator 290. The detected output of modulator 424, representing the elevation error of antenna 300, is fed to servo 412 which in turn causes the antenna to move to correct the error. Servo 412 also supplies an antenna elevation position signal to computer 276. Azimuth error signals are developed in a like manner thru like components: amplifier 428, balanced modulator 430, filter 432, balanced modulator 434 and filter 436. The azimuth error signal, as in the case of the elevation error signal, connects antenna 300 in azimuth thru servo 412. An azimuth position signal is fed from servo 412 to computer 276.

Automatic gain control (AGC) is achieved by demodulating in balanced modulator 437 a portion of the signal output of balanced modulator 387. Balanced modulator 437 receives a reference voltage from oscillator 290. The output of balanced modulator 437 is filtered in low pass filter 439 and the D.C. output employed to control the gain of amplifiers 382, 418 and 428.

As one feature of the invention, a recorded or other source of random noise, provided by source 438, is employed to phase modulate transmitter 440 operating, at reduced power, on the same frequency as the carrier of the NCM transmitter 296. The output of transmitter 440 is radiated by antenna 442. As in the case of the auxiliary transmitter previously described for the missile, transmitter 440 is used to assist in decreasing the danger of effective counter-measures.

Although this invention has been described with respect to particular embodiments thereof, it is not to be so limited as changes and modifications may be made therein which are within the full intended scope of the invention as defined by the appended claims.

What is claimed is:

1. In combination, means for developing a continuous-wave alternating current output generator means for providing a sequence of encoding pulses occurring in a pseudo-random pattern, means for modulating the phase of the continuous wave output signal in accordance with the occurrence of the pseudo-random encoding pulses, means for radiating the phase-modulated output signal toward a target and for receiving a phase-modulated output signal from the target corresponding to the radiated phase modulated signal resonant means responsive to pass only the signals received in a selected frequency range, phase-demodulating means interposed between said resonant means and said receiving means means including a second pseudo-random pulse-generator for controlling the operation of the phase-demodulating means in accordance with the occurrence of pulses in the pseudo-random pattern to convert the signal received from the target to a signal of invariable phase, and means including time delay means included in said controlling means and adjustable in accordance with the range between the target and the radiating and receiving means to cause the control of the phase-demodulating means to coincide with phase modulations in the received signals for the passage of a signal of substantially invariable phase in the selected frequency range to the resonant means for the production of indications as to parameters of the target relative to the radiating and receiving means in accordance with the adjustment in the time delay means.

2. In combination, means for providing an intelligence modulated signal, first and second synchronistical electronics, pseudo-noise generating means for providing identical pseudo-random patterns, means for synchronizing said generating means, modulating means coupled to said signal means and said first generating means for modulating said signal by inverting the phase of said signal in accordance with said random pattern, means responsive to said modulating means for transmitting the inversion modulated signal, means for receiving said transmitted signal, first demodulating means responsive to the received signal and said second generating means for reproducing said intelligence modulated signal, and second demodulation means responsive to the reproduced intelligence modulated signal for obtaining the intelligence modulation.

3. In combination, a signal carrier circuit, an encoder, a subcarrier circuit and a control signal generating means, said subcarrier circuit comprising a subcarrier generator and first modulation means responsive to said control signal generating means for phase modulating the subcarrier by control signals, said encoder comprising a synchronized pseudo-noise generator and multiplier means, said pseudo-noise generator being synchronized by the modulated subcarrier, the output of said pseudo-noise generator being multiplied by said modulated subcarrier in said multiplier means, said signal carrier circuit comprising a carrier generator, a carrier phase modulator and means for transmitting the output of said carrier phase modulator, said carrier phase modulator modulating the output of said carrier generator responsive to the output of said multiplier means.

4. The combination set forth in claim 3 further comprising means for receiving said transmitted output means for decoding the received signal and detecting means for detecting the subcarrier and control signal modulation, decoding means for comprising a synchronistical pseudo-noise generator and decoder multiplying means responsive to said last named generator and received signal for producing sidebands corresponding to said subcarrier about a suppressed intermediate frequency, a first local oscillator of a frequency corresponding to said suppressed intermediate frequency and a first detector responsive to said first local oscillator and said decoding means for reproducing said modulated subcarrier, a second local oscillator corresponding in frequency to said subcarrier, a first 90° phase shifter, a first phase detector responsive to the output of said first detector and output of said second local oscillator supplied thru said first phase shifter for reproducing said control signals, first control means responsive to the direct current component of said first phase detector for locking the frequency of said second local oscillator to the frequency of said subcarrier, an output of sad second local oscillator being connected to said synchronistical pseudo-noise generator to synchronize said last named generator with the frequency of said subcarrier, frequency control means for maintaining the frequency of said first local oscillator at a frequency corresponding to said suppressed carrier, said frequency control means comprising single sideband filter means responsive to said decoder multiplying means for passing one of said sidebands, a second 90° phase shifter, a second detector responsive at one input to the output of said filter means and at a second input to the output of said first local oscillator supplied thru said second phase shifter for producing the difference of said inputs, second phase detector means for comparing the phase of the output of said second local oscillator and the output of said second detector, and means responsive to the output of said second phase detector for controlling the frequency of said first local oscillator.

5. In combination, means for providing an intelligence modulated signal, first and second synchronistical electronic pseudo-noise generating means for providing identical pseudo random patterns, said first and second generating means each comprising a delay circuit having an input, a total delay output and an intermediate delay output, a half adder, an amplifier, a clock oscillator and a gating circuit, said outputs of said delay circuit being coupled to and combined in said half adder, amplified in said amplifier and coupled to the input of said delay circuit, the half adder output being coupled thru said gating circuit, and said gating circuit being controlled responsive to the output of said clock oscillator, means for synchronizing said generating means, modulating means coupled to said signal means and said first generating means for modulating said signal by inverting the phase of said signal in accordance with said random pattern, means responsive to said modulating means for transmitting the inversion modulated signal, means for receiving said transmitted signal, first demodulating means responsive to the received signal and said second generating means for reproducing said intelligence modulated signal, and second demodulation means responsive to the reproduced intelligence modulated signal for obtaining the intelligence modulation.

6. The combination set forth in claim 5 wherein said means for synchronizing comprises an "or" circuit having first and second inputs and an output one of said "or" inputs and said "or" output being connected in series between the output of said half adder and the input of said delay circuit of said second generating means, an output of said first generating means being connectable, at least instantaneously, to said second input of said "or" circuit, means responsive to said clock oscillator of said first and second generating means for controlling the frequency of said second generating means clock oscillator to conform with the frequency of said first generating means clock oscillator.

* * * * *